US006952821B2

(12) United States Patent
Schreiber

(10) Patent No.: US 6,952,821 B2
(45) Date of Patent: Oct. 4, 2005

(54) METHOD AND SYSTEM FOR MEMORY MANAGEMENT OPTIMIZATION

(75) Inventor: Robert S. Schreiber, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 10/223,224

(22) Filed: Aug. 19, 2002

(65) Prior Publication Data

US 2004/0034754 A1 Feb. 19, 2004

(51) Int. Cl.[7] .............................. G06F 9/45; G06F 12/00
(52) U.S. Cl. ........................ 717/151; 717/152; 717/159; 717/160; 711/165
(58) Field of Search ................................ 717/151, 152, 717/159, 160; 711/165

(56) References Cited

U.S. PATENT DOCUMENTS

| | | | | |
|---|---|---|---|---|
| 5,274,812 A | * | 12/1993 | Inoue ........................ | 717/160 |
| 5,551,039 A | * | 8/1996 | Weinberg et al. ........... | 717/154 |
| 5,634,059 A | * | 5/1997 | Zaiki ......................... | 717/160 |
| 5,717,895 A | * | 2/1998 | Leedom et al. ............. | 711/140 |
| 5,742,814 A | * | 4/1998 | Balasa et al. ............... | 717/155 |
| 5,802,375 A | * | 9/1998 | Ngo et al. .................. | 717/160 |
| 5,845,126 A | * | 12/1998 | Ju et al. .................... | 717/160 |
| 5,875,466 A | * | 2/1999 | Wakerly ..................... | 711/159 |
| 5,953,531 A | * | 9/1999 | Megiddo et al. ............ | 717/160 |
| 5,954,803 A | * | 9/1999 | Nakai et al. ................ | 711/154 |
| 5,987,254 A | * | 11/1999 | Subrahmanyam ........... | 717/155 |
| 6,016,397 A | * | 1/2000 | Ogasawara et al. ......... | 717/160 |
| 6,055,627 A | * | 4/2000 | Kyushima et al. ........... | 712/233 |
| 6,078,745 A | * | 6/2000 | De Greef et al. ........... | 717/151 |
| 6,108,724 A | * | 8/2000 | Din ............................ | 710/52 |
| 6,298,071 B1 | | 10/2001 | Taylor et al. | |
| 6,324,629 B1 | * | 11/2001 | Kulkarni et al. ............ | 711/165 |
| 6,609,088 B1 | * | 8/2003 | Wuytack et al. ............ | 711/165 |
| 6,681,388 B1 | * | 1/2004 | Sato et al. .................. | 717/159 |

OTHER PUBLICATIONS

Eisenbeis, et al. "A Strategy for Array Management in Local Memory", 1990, Institut National de Recherche en Informatique et en Automatique, p. 1–40.*

Eisenbeis, C., et al. "A Strategy For Array Management In Local Memory" Institut National de Recherche en Informatique et en Automatique (Jul. 1990) pp. 1–40.

Agarwal, A., et al. "Automatic Partitioning of Parallel Loops and Data Arrays for Distributed Shared Memory Multiprocessors." pp. 1–41.

U.S. Appl. No. 10/284,844, filed Oct. 31, 2002, Schreiber et al.

U.S. Appl. No. 10/284,932, filed Oct. 31, 2002, Schreiber et al.

U.S. Appl. No. 10/284,965, filed Oct. 31, 2002, Gupta et al.

R. Schreiber, et al. "PICO–NPA: High–Level Synthesis of Nonprogrammable Hardware Accelerators," Journal of VLSI Signal Processing, to appear.Hewlett–Packard Laboratories, Palo Alto, California 94304–1126, pp. 1–22.

J. Steensma, et al., "Symbolic Macro Test for DSP Systems Applied to a Voice Coder Application," pp. 215–223.

J. Rosseel, et al., "An Optimisation Methodology for Array Mapping of Affine Recurrence Equations in Video and Image Processing," IEEE, pp. 415–426 (1994).

(Continued)

Primary Examiner—Todd Ingberg
Assistant Examiner—Qamrun Nahar

(57) ABSTRACT

A system and method of automatically configuring memory in a data processing system, including the steps of: receiving source code containing a loop nest, wherein the loop nest includes data arrays with affine indexes; optimizing source code by relocating elements from a first array in memory to a second array in memory; and executing the optimized source code.

34 Claims, 3 Drawing Sheets

OTHER PUBLICATIONS

S. Malik, "Analysis of Cyclic Combinational Circuits," Short Papers IEEE Transactions on Computer–aided Design of Integrated Circuits and Systems, vol. 13, No. 7, (Jul. 1994) pp. 950–956.

A. Srinivasan, et al. "Practical Analysis of Cyclic Combinational Circuits," IEEE 1996 Custom Integrated Circuits Conference, pp. 381–384.

Guest Editorial, IEEE Transactions on Computer–aided Design of Integrated Circuits and Systems, vol. 18, No. 1, (Jan. 1999) pp. 1–2.

K. Danckaert, et al. "Strategy for Power–Efficient Design of Parallel Systems," IEEE Transactions on Very Large Scale Integration (VLSI) Systems, vol. 7, No. 2, (Jun. 1999) pp. 258–265.

F. Vermeulen, et al., "Extended Design Reuse Trade–Offs in Hardware–Software Architecture Mapping," (2000) pp. 103–107.

R. Schreiber, et al., "High–Level Synthesis of Nonprogrammable Hardware Accelerators," IEEE (2000) pp. 1–12.

S. Mahlke, et al., "Bitwidth Cognizant Architecture Synthesis of Custom Hardware Accelerators," IEEE Transactions on Computer–Aided Design of Integrated Circuits and Systems, vol. 20, No. 11, (Nov. 2001) pp. 1355–1371.

P. R. Panda, et al., "Data and Memory Optimization Techniques for Embedded Systems," ACM Transactions on Design Automation of Electronic Systems, vol. 6, No. 2, (Apr. 2001) pp 149–206.

S. Meftali, et al., "An Optimal Memory Allocation for Application–Specific Multiprocessor System–on–Chip," (2001) pp. 19–24.

T. Van Achteren, et al., "Data Reuse Exploration Techniques for Loop–dominated Applications," Proceedings of the 2002 Design, Automation and Test in Europe Conference and Exhibition , IEEE Computer Society,( Jan. 2002).

"Omega Project Source Release, version 1.2 (Aug. 2002)," [on–line] [retrieved on : Jul. 16, 2002], Retrieved from: http://www.cs.umd.edu/projects/omega/release–1.2.html, pp 1–2.

Seeds for Tomorrow's World—IMECnology, [on–line] [Retrieved on Jun. 12, 2002] Retrived from: http://www.imec.be/.

G. Havas, et al. "Extended GCD and Hermite Normal Form Algorithms Via Lattice Basis Reduction," Experimental Mathmatics, v. 7 (1998).

* cited by examiner

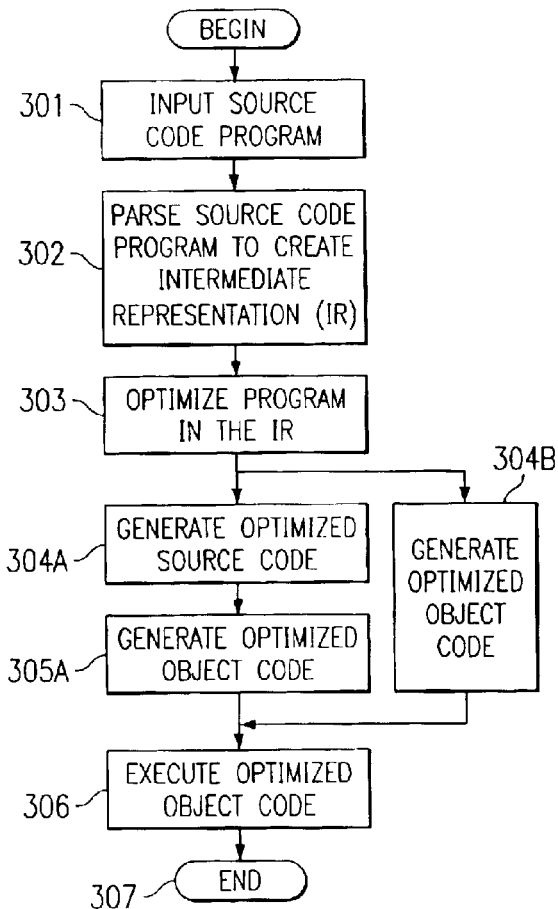
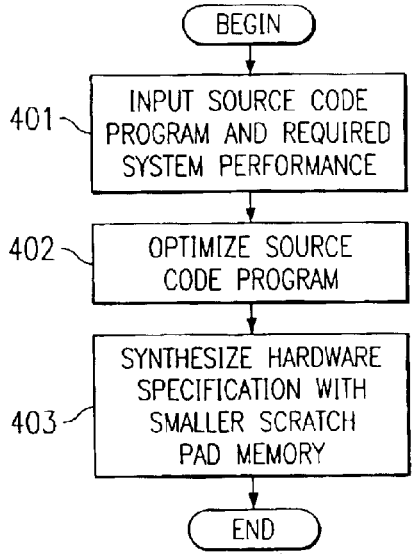
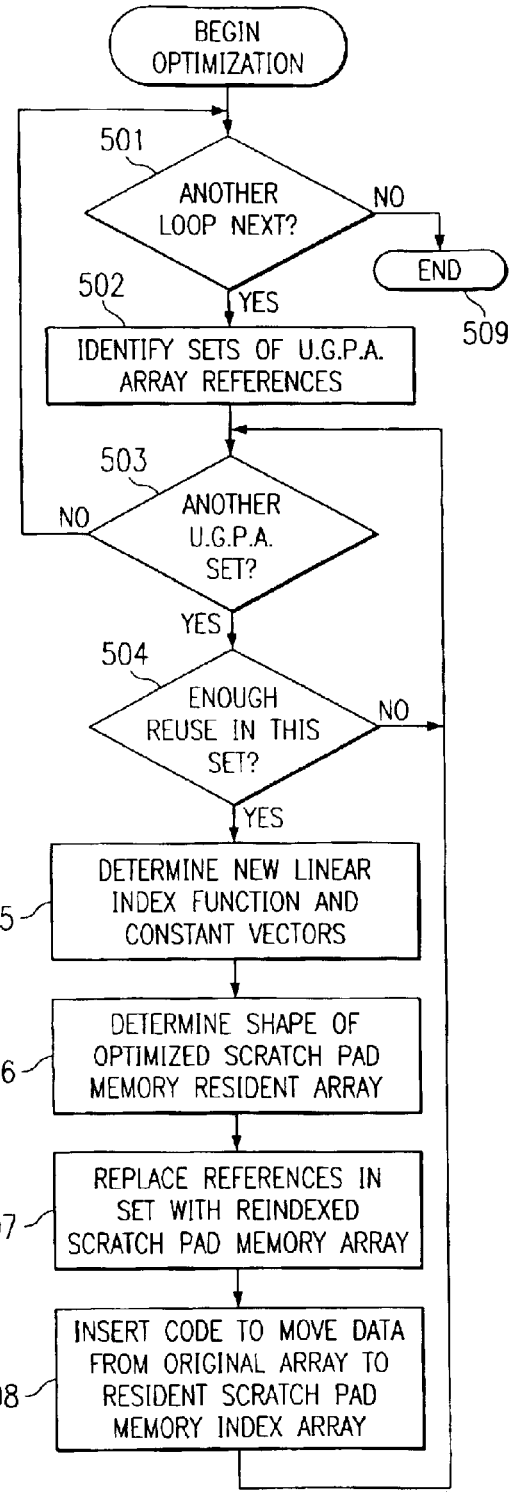

METHOD AND SYSTEM FOR MEMORY MANAGEMENT OPTIMIZATION

FIELD OF THE INVENTION

The present invention relates generally to data processing and, more particularly, to improved usage of local memory including scratch pad memory and cache.

BACKGROUND

A conventional computer architecture typically includes a Central Processing Unit (CPU) connected to a main memory system and various Input/Output (I/O) facilities. Data, including instructions, moves between the main memory and the CPU. The overall bandwidth between main memory and the CPU is limited by a number of factors including memory access time, word size, bus width, bus speed, etc. In most cases, particularly those cases involving a large amount of data (e.g., scientific computer applications, image/video processing, etc.) the memory bandwidth between the CPU and main memory creates a bottleneck and may reduce overall system performance to an unacceptable or undesirable level.

To reduce potential bottlenecks between main memory and the CPU, computer designers may use a multi-level memory hierarchy, such as a memory hierarchy that includes the provision and use of small numbers of registers internal to the CPU, external main memory and one or more levels of intermediate cache memory. Cache memory decreases the time needed by a CPU to access data, thereby minimizing data latency. As a result, cache memory improves performance of the executing application.

Cache memory is generally not directly accessible or manipulable by the program. That is, cache memory operation is generally not part of the application program interface but is instead controlled by a dedicated controller or similar hardware. In general, cache memory is designed to be transparent to the CPU, and is treated as fast main memory. A compiler that processes source code to provide object code programs and the program performing the "load" and "store" commands into main memory use and benefit from the cache memory without having any direct program control over its use. At runtime, hardware may automatically transfer data and/or instructions that are associated with a range of addresses in main memory to the cache. When the CPU makes a subsequent request for data from these addresses, the data is provided from the cache.

Systems that require high performance hardware, such as digital signal processors and custom computer engines, typically require high memory bandwidth to support high-speed computations. The standard cache arrangement as explained above may not provide enough memory bandwidth for these types of systems and, even though cache may be used to supplement main memory, bottlenecks may still occur. To provide additional local memory bandwidth so that bottlenecks do not or are less likely to occur, in addition to cache memory, computer designers may include small, fast local memory called Scratch Pad Memory (SPM) in their computer design. SPM is local memory that is typically connected directly to the CPU.

SPM is available for use by a programmer through an application program interface. For example, a program's "load" and "store" instructions may explicitly address either a main memory area or a particular local SPM area. The program explicitly places a given data item in one of these separate memory spaces. An SPM may provide data directly to the CPU without using main memory or system bus bandwidth or space within cache memory. SPM, therefore, further improves system performance and decreases the time required for a CPU to access data. As a result, the SPM improves performance of the executing application.

Currently, data is relocated to SPM by a computer programmer and not inserted automatically by the compiler at program compile time. It is therefore desirable to automatically configure SPM usage and make the most efficient use of SPM.

SUMMARY OF THE INVENTION

A method of automatically configuring memory in a data processing system, including the steps of: receiving source code containing a loop nest, wherein the loop nest includes data arrays with affine indexes; optimizing the source code by relocating elements from a first array in a first memory to a second array in a second memory; further optimizing the arrangement of the elements of the relocated array in the second memory to minimize the amount of second memory resources required to hold the elements; and executing the optimized source code.

BRIEF DESCRIPTION OF THE DRAWINGS

FIG. 3 is a flow chart of the steps performed when compiling source code according to one embodiment of the present invention;

FIG. 4 is a flow chart of the steps performed when synthesizing hardware using SPM according to one embodiment of the present invention;

FIG. 5 is a flow chart of the steps performed when optimizing SPM space according to one embodiment of the present invention;

DETAILED DESCRIPTION

Figure 1:
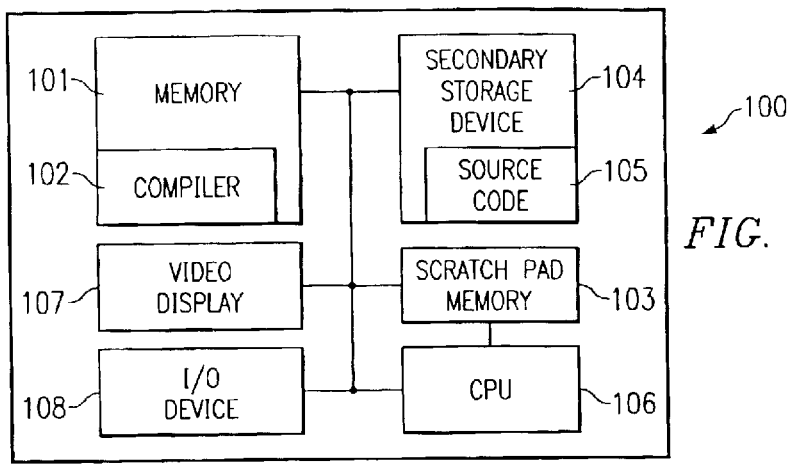
FIG. 1 shows a block diagram of a computer consistent with one embodiment of the present invention.

Methods and systems incorporating aspects and features of the present invention enhance the use of main and local memory (e.g., SPM, cache, cache mirror array, etc.) by automatically managing the placement of data into the local memory. According to one aspect of the invention, a regular addressing scheme used to access elements of a data structure is translated to compress the address space to that required by elements predicted to be needed, while eliminating unused elements from the address space. A compiler for converting source code into object code may identify data arrays and their accesses in loop nests in the source code. During compilation, the compiler may identify loop nests in which certain elements of certain data arrays are used repeatedly in the loop nest. If these certain elements of the identified data arrays are moved into the local memory, performance is improved. By identifying certain elements in the data arrays in main memory that may be relocated to faster local memory, methods and systems consistent with the present invention may optimize the source code and/or resultant executable object code and make more efficient use of the local memory.

For purposes of explanation, a first embodiment consistent with the invention will be described in terms of a large array stored in a main memory with elements of the array to be accessed by a particular loop nest stored into a local scratch pad memory. However, the invention is equally applicable to other platforms, memory types, data structures, etc. For example, another embodiment of the invention is directed to enhanced use of cache wherein elements of a data structure to be accessed by a portion of a program are copied from a first array defined in main memory into a second, smaller array, also stored in main memory. By defining and using the smaller array to provide access to active array elements, the cache system automatically targets this smaller array for storage in the cache memory. The smaller array, known as a cache mirror array exists both in main memory and in cache. Because the smaller array is substantially limited to only required elements, most of the words in every cache line will be required elements. Still further memory configurations, data structures and types, platforms, etc. are usable with and benefit from various embodiments and aspects of the present invention.

A first embodiment addresses SPM memory resources and management. Because SPM memory resources are typically insufficient to store an entire array or similar ordered data structure (e.g., digital tree, etc.), a methodology is employed to efficiently store a portion of the array. According to an aspect of the invention, the indexing scheme used to access the array may be analyzed to identify a pattern to the array elements to be multiply accessed and avoid storing array elements that will be skipped. An addressing translation may then be formulated to map from the larger array address space to the reduced SPM address space while minimizing or avoiding dedication of SPM address space to skipped array elements. Thus, the SPM stores only those elements accessed by a particular indexing scheme while avoiding storage of unused array elements.

Specifically, methods and systems consistent with the present invention determine which elements of a program array variable should be stored in SPM for the duration of a program loop nest and determine where those elements will be stored in the SPM. To effectively use SPM while compiling source code of a program written in a high level language, such as C, the compiler needs to decide: (a) what data to put into the SPM; (b) where (e.g., at what addresses) in the SPM to put the data; (c) what code (i.e., set of instructions) to generate to move data between main memory and the SPM; and (d) what code to generate to load and store the data in the SPM.

By moving certain frequently used elements in data arrays from main memory to SPM, data latency may be reduced and higher performance may be achieved. In addition, by automatically determining data usage of the SPM, the designer of an embedded hardware system may achieve a given level of computer performance with the smallest possible SPMs, thereby reducing the hardware cost of the designed system.

A typical loop nest (i.e., a set of loops one inside the next) found in source code may contain or reference multiple arrays. For purposes of illustration, we posit a two-level perfect loop nest structure using index variables i and j to access elements of arrays A, B, and C, as follows:

```
for (i=0; i < 100; i++)
    for(j=0; j<100; j++)
        A[i+j] [i*j] = B[i+j+1] + C[i] [i];
```

A linear index function is of the form: (i) a loop index variable (such as i or j in the example above); (ii) a constant times a linear function; or (iii) the sum of two linear functions resulting in a change of scale. Thus, a linear function is indicative of spacing between elements to be accessed. An affine function is a constant plus a linear function providing a linear translation. In this exemplary loop nest, there are three data arrays referenced (array A, array B and array C). Arrays A and C are two-dimensional arrays addressed by respective ordered pairs of index values and array B is one-dimensional addressed by a single index value. For each program reference there is an array index function used to specify the element referenced. Referring to the example loop nest above, the single index of array B (i.e., the value i+j+1), both indices of array C, and the first index of array A are affine functions, i.e., include a linear function and added fixed or constant offset value. Since each array reference has one or more affine index functions, all three array references are "partially affine."

With index variables i and j having values stepping between 0 and 99, a total of 10,000 access will be made to elements of arrays A, B, and C. In particular, array elements in the range of A [0] [0] through A [198] [9801]; B [1] through B [199] and C [0] [0] through C [99] [99]. If all elements of A are considered within the specified range, assuming a row-major ordering (i.e., in the form A [row] [column], the last dimension, termed the column, varies the fastest so that consecutive entries of a row are stored adjacent one-another), a total of 199×9801=1,940,796 elements would be contained within the range, while only 10,000 accesses would be performed. Thus, at a minimum 99.48% of the array elements stored are not needed by the loops. On the other hand, all elements within the 200 element range limit of B are accessed. However, in the case of C, only diagonal elements are accessed representing 100÷(100×100) or 1% of the total number of elements of the array. An embodiment of the present invention provides a mapping from the relatively large address range or space for at least those elements accessed to a SPM space in which unused references are minimized or eliminated so as to not require storage allocation in SPM.

For each partially affine array in main memory, the compiler may allocate one or more areas in the SPM (called a SPM host array) to hold the part of the array referenced in the loop nest. The SPM host arrays are preferably considerably smaller than the original complete array stored in main memory as each stores only the elements "accessed" by a particular loop nest. The compiler may allocate the host array to hold the accessed elements in the original array. An element in an array is accessed if the element is accessed (i.e., read from or written to) during any iteration of the loop nest. The compiler may relocate part of each partially affine array into the SPM prior to starting the loop nest. The relocated elements are a subset of the elements of the original array including at least the array elements accessed by the loop nest. Each accessed element in the loop nest in the original array is replaced with a reference to an element of the array in SPM. It is useful to require that there is an affine relationship between the index of an original array element and the index of the corresponding SPM host array element, and the methods of at least one embodiment of the present invention enforce this restriction.

Automatically managing SPM provides a number of benefits over traditional methods of managing SPMs. Automatically managing SPM enables the compiler to make the most efficient use of a target machine's SPM. By managing the SPM, the compiler may achieve higher performance on a given problem by packing into the SPM only the relevant data (e.g., accessed elements) of each array referenced; space is not allocated to elements not accessed. This allows the compiler to pack the relevant parts of a larger set of arrays into the SPM. It also may allow the compiler to keep data in the SPM for a longer period, because there is less contention for space in the SPM. Additionally, automatically managing SPM enables a computer designer to create an embedded computer with the smallest possible SPM. By using less SPM, the total cost of the embedded computer is reduced. P FIG. 1 depicts a detailed view of computer 100, including main memory 101, SPM 103, secondary storage device 104, Central Processing Unit (CPU) 106, video display 107 and input/output device 108 connected by system bus. Main memory 101 stores compiler 102. Compiler 102 may operate on source code 105 stored in secondary storage device 104 to produce executable object code. For simplicity it is assumed that related functions including, for example, linking and loading, are performed as necessary to provide an executable object module. Thus, memory allocation, including SPM, may be performed by a combination of software and other systems including, but not limited to, a compiler, linker, loader, specialized utility, etc.

An example of a compiler suitable for use with methods and systems consistent with an embodiment of the present invention is any generic C compiler when adapted for use on a target machine, such as many off-the-shelf Digital Signal Processors (DSPs), that have SPM, as modified to the extent necessary to cooperate with other systems to implement SPM functionality according to an embodiment of the present invention. An example of an architecture synthesis program suitable for use with the methods and systems consistent with an embodiment of the present invention is the HP Labs PICO system. The compiler provides functionality according to the present invention so as to automatically generate appropriate object code (including object code file(s) and/or object module(s) and load modules) enabling intelligent use of the SPM. SPM 103 may be used to temporarily store certain elements from data arrays located in main memory 101. SPM 103 may also provide the stored elements directly to the CPU without interfacing with main memory 101, thereby improving performance and reducing data latency. Access to SPM 103 is enhanced by providing a direct interface between it and CPU 106 to support high speed data access and storage. Secondary storage device 104 may contain source code 105. Source code 105 may be a program written in a high level language, such as the C programming language. Source code 105 contains loop nests, and data arrays are accessed (read and written) within (i.e., in response to instructions included within) those loop nests.

Secondary storage device 104 may further store object modules including library modules and executable modules or portions thereof, particularly when a paging mode of operation is used for execution of a large program.

Figure 2A:
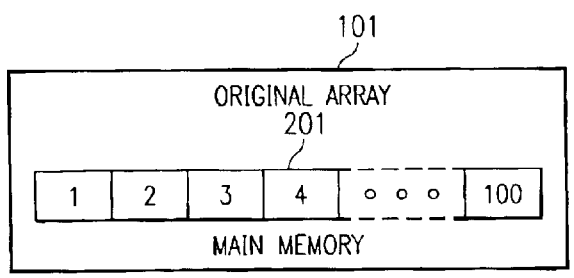
FIGS. 2A and 2B show a more detailed diagram of main memory and Scratch Pad Memory (SPM) memory shown in FIG. 1.
Figure 2B:
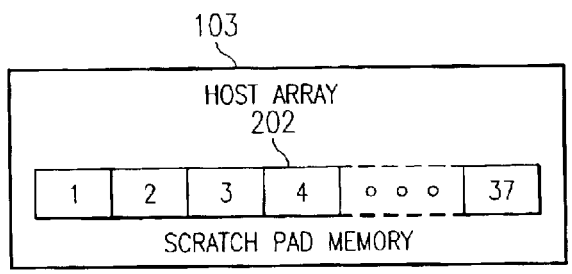

FIGS. 2A and 2B depict a more detailed view of a data map depicting locations of data structures stored in main memory 101 and SPM 103. Main memory 101 may contain original array 201 including all elements to be processed by CPU 106. Original array 201 includes both accessed and unaccessed elements. SPM 103 may contain a host array 202, ideally, including a subset of elements from original array 201 to be processed by CPU, such as only those elements in original array 201 that are actually predicted to be accessed by a certain loop nest (i.e., assuming normal entry to and exit from the loop nest).

According to one embodiment of the invention, a function provides a mapping from the address space used to access elements of original array 201 to an address space storing, in host array 202, a subset of elements, including elements of original array 201 to be accessed while excluding or minimizing the number of unused elements.

As explained, elements in host array 202 may be processed more rapidly than those elements in original array 201, since CPU 106 may directly access SPM 103 without interfacing with main memory 101 or contending for access to shared system bus facilities. The host array in SPM 103 is made as small as possible by selecting a suitable choice of the affine mapping from the original array indices to the host array indices. Elements may also be moved from original array 201 to host array 202, such that the compiler may use (i.e., produce an object module referring to) elements from SPM 103 instead of main memory 101. After CPU 106 processes the elements in any given loop nesting, the elements may be moved back to main memory 101. The compiler generates the appropriate code as part of, for example, the object module, to perform the appropriate data transfers and moves between main memory 101 and SPM 103.

FIG. 3 depicts a flow chart of the steps performed by compiler 102 when compiling source code 105. The process is initiated, for example, by compiler 102 receiving source code 105 from secondary storage device 104 (step 301). The source code may contain loop nests containing instructions to access data arrays, the data arrays addressed with affine indexes. Once received, compiler 102 may optimize source code 105 by including code for relocating elements from original array 201 to host array 202 in SPM 103 (step 302). Step 302 is further described below with reference to FIGS. 5 and 6. In general, step 302 includes identification of loop nests and/or portions of loop nests, generating a function mapping an address space of the identified elements to an address space of the SPM, replacing references to the original address to the address space of the SPM, and generating code appropriate to effect the transfer of data between main memory and SPM (i.e., memory management overhead functions). Once these code changes have been made, compiler 102 may compile the source code to create object code (step 303).

In one implementation, the compiler parses the original source code and creates an Intermediate Representation (IR) of the program. IR is a standard compiler term, referring to the data structure that represents the program inside the compiler. The compiler optimizes the program as a transformation of the intermediate representation (step 303). It then regenerates an optimized program in C or in another high-level language (step 304A). That optimized program may be compiled by a conventional compiler (step 305A) to create an executable object program. The benefits of the optimization are obtained through the creation of the optimized source code program. In this role a method according to one embodiment of the invention may be incorporated into or as part of a compiler preprocessor.

In another embodiment of the invention, the compiler parses the original source code and creates an IR of the program. As part of creation of the IR, the compiler optimizes the code (step 303) as a transformation of the IR. It then proceeds to directly compile the optimized IR into an executable object program (step 304B). Using either method, the resultant optimized object code may then be executed at step 306, the method terminating at step 307. The benefits of the optimization are obtained by virtue of the fact that the generated object program includes the optimized code. In this role, the method may be part of the high-level optimization processing phase of a compiler.

In yet another embodiment of the invention, an object code program may be analyzed to find loop nests containing partially affine references. The memory optimizations described are then applied to transform the initial object code program into an optimized object code program. In this role, a method according to an embodiment of the invention is performed as part of a compiler postprocessor, or of the low-level optimization, a phase of compiler operations.

FIG. 4 depicts an alternative embodiment consistent with the present invention when determining the smallest amount of SPM needed for an embedded computer system and determining the most efficient use of the SPM. First, compiler 102 may receive source code program 105 and computer system performance parameters, such as the total number of clock cycles allowed to perform some or all of the loop nests in the program (step 401). Once received, compiler 102 may optimize source code 105 by relocating elements from original array 201 to host array 202 in SPM 103 (step 402). Step 402 is further described below with reference to FIGS. 5 and 6. Once optimized, compiler 102 may create a set of hardware specifications that indicate the smallest amount of SPM needed to compile source code 105 based on the optimization (step 403).

FIG. 5 depicts a flow chart of the steps performed when optimizing source code to use SPM 103 according to one embodiment of the present invention. Providing a mapping between address spaces may be based on a matrix representation of the index functions and an understanding of affine transformations. First, for each loop nest (or subset of loop nests) in source code 105 (step 501), compiler 102 identifies sets of Uniformly Generated Partially Affine (UGPA) array references (step 502). An array reference (i.e., index) is partially affine if one or more of the array index functions in the reference is affine (a constant plus a linear function). Two partially affine references are uniformly generated if the linear parts (i.e., the multiplier term) of their affine references are identical. For example, array references F[2i] and array F[2i+1] are uniformly generated, affine references since the linear part, "2i", is the same in both references to F. A set of partially affine references is UGPA if each pair of references in the set is uniformly generated.

The linear part of a partially affine reference can be expressed as an integer matrix. If there are "n" loop index variables and there are "m" affine index functions in a reference, then the matrix that expresses this reference has m rows and n columns.

A lattice is the set of integer linear combinations of a set of vectors. The lattice generated by a matrix is the set of integer linear combinations of the columns of this matrix. If X is a matrix and {x_1, x_2, ..., x_n} are the columns of X, then the lattice generated by X is the set of vectors of the form {a_1 x_1+ ... +a_n x_n} where the parameters {a_1, ..., a_n} are allowed to be arbitrary integers.

Two uniformly generated references, having the same linear part but which may have different constant parts are said to be "alias equivalent" iff (if and only if) the difference between their constant parts is in the lattice generated by the integer matrix of their linear part. For example, the two references F[2i] and F[2i+2] are uniformly generated affine references with a common linear part (2i) whose matrix (i.e., multiplier term) is (2). The lattice generated by this matrix consists of all of the multiples of (2), that is, all the even integers. The two references have constant parts 0 and 2, and the difference between their constant parts, 0−2=−2, is an even integer, so it is in the lattice generated by the matrix of their linear part. Therefore these two references are alias equivalent. On the other hand, the reference F[2i+1] is uniformly generated with these other two references, but it is not alias equivalent to them. The property of alias equivalence is transitive: if reference R1 is alias equivalent to reference R2 and R2 is alias equivalent to reference R3, then it must be the case that R1 is alias equivalent to R3.

For example, below is an exemplary loop nest in source code 105 containing arrays A and B:

```
int A[ 5][20][20];
int B[70][30];
for (i = 0; i < 5; i++)
    {
        for (j = 0; j < 10; j++)
        {
            for(k = 0; k < 15; k++)
            {
                A[i][2*j][k+3] = i+j+k;
                B[2*i + 4*k + 0][i + 2*j + 0] =
                B[2*i + 4*k + 0][i + 2*j + 0] +
                B[2*i + 4*k + 1][i + 2*j + 0] +
                B[2*i + 4*k + 2][i + 2*j + 3];
            }
        }
    }
```

In the above example loop nest consisting of three loops incrementing, in turn, k, j and i, there are two identified sets of UGPA array references. Set 1 has one distinct reference to the three dimensional array A: A[i][2*j][k+3] and Set 2 has the three distinct references to the two dimensional array B: B[2*i+4*k][i+2*j], B[2*i+4*k+1][i+2*j+0] and B[2*i+4*k+2][i+2*j+3].

Once the sets of UGPA array references are identified, for each UGPA set, compiler 102 partitions the references into a set of subsets of references. Within each subset, all of the references are alias equivalent.

Once the alias-equivalent subsets of UGPA array references are identified, for each Alias-Equivalent Uniformly Generated Partially Affine Subset (AEUGPAS) (step 503), compiler 102 determines a new linear index function (step 505) and for each reference in the subset the compiler determines if there is sufficient reuse in the set (step 504) under examination to warrant inclusion. While unused references may clearly be excluded, references used only once or some small number of times may also be excluded so as to avoid incurring overhead costs exceeding benefits achieved by including the reference. These overhead costs may include, for example, processing time required to transfer data to SPM and, possibly, write-back data into main memory. In addition to accounting for fixed and variable overhead, step 504 may take into account the size of available SPM so as to include at least the most frequently accessed references or by implementing some other criteria to maximize system performance.

As explained, each array reference in the AEUGPAS has the same linear part of its index function and a different constant part of its index function. To store the references from original array 201 into host array 202, a new linear and constant part of the index function may be determined. That is, the partially affine references to original array 201 are replaced with re-indexed references to the host array 202 in which the linear and constant parts of the affine index functions are replaced with new linear and constant parts. This will be a correct program transformation if each element of original array 201 that is referenced in the loop nest has exactly one corresponding position in host array 202, given by the new indexing functions. That is, if two iterations of the loop nest reference the same element of original array 201, then each iteration must reference the same element of host array 202, and no two different elements of original array 201 referenced in the loop nest may share or map to the same position in host array 202.

After determining a new linear index function and constant vector, elements in the original array may be relocated to the host array. The new linear index function and constant vector provide a map to the SPM. Host array 202 is preferably substantially smaller than original array 201 and, therefore, requires less space in SPM 103. The test provided by step 503 is further described below with reference to FIG. 6.

It should be noted that the compiler may decide (i.e., implement a threshold function) not to use an SPM host array when the benefit from doing so would be outweighed by the required overhead, e.g., the cost of moving data between the SPM host array and the main memory array. For example, SPM may be inefficient where there is little or no reuse of the data once it is migrated to the SPM array, such as when overhead requirements offset any speed increase provided by having data in SPM.

After the new linear index function and constant vectors for host array 202 in SPM 103 are determined, the shape of host array 202 may be determined (step 506). The shape of host array 202 is typically not the same as, and is usually much smaller than, the shape of the original array 201. That is, the locus of all elements stored in the original array is typically defined by a regular polyhedron shaped space, while the geometry of elements accessed may be irregular and, in any case, define a smaller address space. Mapping from the original array address space to the SPM address space may result in an irregular SPM address space better fitted to the data to be accessed. Thus, the compiler replaces references in the AEUGPAS with reindexed references to a virtual host array, which does not yet have a determined shape, using the new linear index function in place of the original linear index function and the new constant vectors in place of the original constant vectors in each of the affine index functions.

To determine the shape of the host array, compiler 102 calculates the size of the smallest rectangle containing all of the entries in said virtual host array that are referenced by a particular set of loops comprising a loop nest using the new indexing function just installed, the associated loop nest being implemented by source code 105. Note that a "loop nest" may include one or more nested loops which, in turn, may be part of a larger loop nest. More formally, loopnest= loop contain within loop or loopnest contained within loop. The section of the number of loops to be processed according to an embodiment of the invention may be based on several factors including the size of available SPM and the amount of SPM required to store the remapped data for a particular number of inner-most loops comprising a loopnest. Compiler 102 may use the shape of this smallest possible rectangle to define the boundaries of host array 202 so that all of the accessed elements original array 201 are included in host array 202. Compiler 102 inserts a declaration of host array 202 into the optimized source code program once it has determined the shape of host array 202. The declaration reserves space for host array in SPM and provides for generation of the appropriate symbol tables.

Once the shape of host array 202 is determined (step 506), compiler 102 may replace references identified in each set of UGPA references in original array 201 from source code 105 with references to host array 202 (step 507). Based on the new linear index function and constant vector (determined in step 505), all occurrences of the array references in original array 201 may be replaced. Each reference in the original array is replaced with a reference to the host array.

Finally, code to move elements from original array 201 to host array 202 array is inserted into source code 105 (step 508). For example, if an original array in source code 105 has 80,000 elements and only 800 elements are actually accessed, references to the 800 elements may be relocated to references to a host array having 800 elements in SPM 103. To do so, compiler 102 inserts code into source code 105 to move the accessed elements from main memory 101 to SPM 103. This source code may consist of a loop nest that loops over the elements of the SPM host array. For each element of the SPM host array there is a calculation of the location of the corresponding element in the original array. The data is moved by as assignment statement from the original array element whose location has been calculated to the host array element. A method for calculating the original array index corresponding to a given host array index is specified in more detail below.

Compiler 102 also recasts certain elements (using a reference to those elements) from original array 201 to host array 202. Thus, if any changes have been made to the elements while in host array 202 (e.g., writes), compiler 103 may generate code to move the changed elements back to original array 201 at program execution time.

Figure 6:
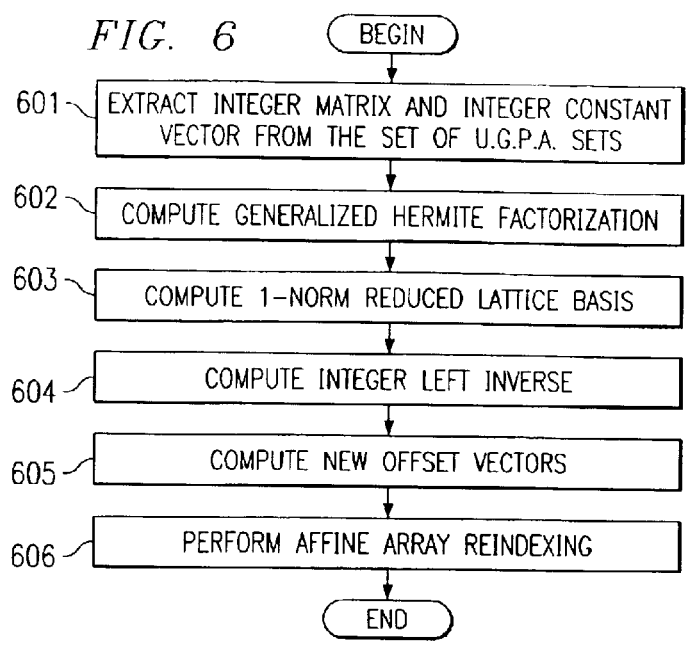
FIG. 6 is a flow chart of the steps performed when determining a new linear index function and constant vector according to one embodiment of the present invention.

FIG. 6 is a flow chart of steps performed to determine a new linear index function and constant vector according to one embodiment of the present invention. First, compiler 102 extracts an integer matrix (e.g., "F") and a set of integer constant vectors (e.g., {f_1, f_2 f_3}) from the set of UGPA sets (step 601). For example using the above example referred to in FIG. 5, the integer matrix for Set 1 (A[i][2*j][k+3]) may be:

$$F = \begin{pmatrix} 1 & 0 & 0 \\ 0 & 2 & 0 \\ 0 & 0 & 1 \\ \uparrow & \uparrow & \uparrow \\ i & j & k \end{pmatrix} \begin{matrix} \leftarrow \text{first term: } 1 \times i \\ \leftarrow \text{second term: } 2 \times j \\ \leftarrow \text{third term: } 1 \times k \end{matrix}$$

representing the coefficients of index and the constant vector for Set 1 may be:

$$f\_0 = \begin{bmatrix} 0 \\ 0 \\ 3 \end{bmatrix} \begin{matrix} \leftarrow \text{first index term: } +0 \\ \leftarrow \text{second index term: } +0 \\ \leftarrow \text{third index term: } +3 \end{matrix}$$

representing the constant term. The integer matrix for Set 2 may be:

$$F = \begin{bmatrix} 2 & 0 & 4 \\ 1 & 2 & 0 \\ \uparrow & \uparrow & \uparrow \\ i & j & k \end{bmatrix} \begin{matrix} \leftarrow \text{ first index term: } [2 \times i + 0 \times j + 4 \times k] \\ \leftarrow \text{ second index term: } [1 \times i + 2 \times j + 0 \times k] \end{matrix}$$

representing the coefficients of index terms i, j, and k and the constant vectors for Set 2 may be:

$$f\_1 = \begin{bmatrix} 0 \\ 0 \end{bmatrix} f\_2 = \begin{bmatrix} 1 \\ 0 \end{bmatrix} f\_3 = \begin{bmatrix} 2 \\ 3 \end{bmatrix} \begin{matrix} \leftarrow \text{ first index term} \\ \leftarrow \text{ second index term} \end{matrix}$$

Once the integer matrix and constant vectors are extracted for all UGPA sets, the compiler partitions each UGPA set into AEUGPA subsets. For example using the above example referred to in FIG. 5, Set 2 may be partitioned into one AEUGPAS consisting of the references with constant vectors f_1 and f_3, and a second AEUGPA subset consisting of only reference f_2.

Every integer matrix has a generalized hermite factorization. The generalized hermite factorization may be described as follows: If F is an m X n integer matrix of rank r, then F=HV, where (i) H and V are both integer matrices that are called the generalized hermite factors of F;
(ii) H is an m x r matrix of rank r;
(iii) Each column of H is not identically zero and has a leading nonzero element;
(iv) The leading nonzero element of each column of H is a positive integer;
(v) Each column of H has more leading zeros than the previous columns of H;
(vi) Each element of H that lies in the same row of H as a leading nonzero element is smaller in absolute value than that leading nonzero element;
(vii) V is an r x n matrix;
(viii) V consists of the first r rows of a unimodular matrix.

A unimodular matrix is an integer matrix with determinant of either 1 or −1. Methods to compute the generalized hermite factors of a given integer matrix are well known in the field of integer matrices as described by, for example, George Havas, Bohdan S. Majewski, and Keith R. Mathhews, "Extended GCD and Hermite Normal Form Algorithms Via Lattice Basis Reduction," *Experimental Mathematics*, v. 7 (1998), pp. 125–136.

Once the integer matrix and constant vectors are extracted for all UGPA sets, compiler 102 determines the generalized hermite factorization of the integer matrix (step 602). For example using the above example referred to in FIG. 5, the generalized hermite factorization for Set 1 may be: F=H V where H is equal to F and V is the identity matrix. The generalized hermite factorization for Set 2 may be:

$$F = HV,$$

where $$H = \begin{pmatrix} 2 & 0 \\ 1 & 2 \end{pmatrix}$$

and V consist of the first two rows of the unimodular matrix $$\begin{pmatrix} 1 & 0 & 2 \\ 0 & 1 & -1 \\ 0 & 0 & 1 \end{pmatrix}.$$

The length of a vector can be measured using various methods including, for example, a measure of the length of a vector provided by its 1-norm, which is the sum of the absolute values of the elements of the given vector. For a set of vectors, we may measure the 1-norm of each vector in the set and take the product of these as a measure of the size of the set of vectors.

If a single affine reference with the linear part F occurs in a loop nest, and the loops of the nest have iteration counts given by the vector z, then the size of the smallest rectangle that contains all of the array elements referenced in this loop nest is well approximated by the product of the 1-norms of the rows of the matrix obtained by multiplying each column of F by the corresponding element of z. The present invention provides means to reduce this estimate of the size of an SPM host array by choosing a new linear indexing function for which the estimate is smaller than it is with the original linear indexing function whose matrix is F.

The matrix of the new linear indexing function that is used to reference elements of the host array is G V, where V is the hermite factor of F determined above, and G is an r X r unimodular matrix determined as follows.

At the iteration of a loop nest having an iteration index of vector I, a typical reference in an equivalence class accesses the array element whose original array index is F I+f. This iteration in the optimized loop nest will instead access the SPM host array element whose array index is G V I. The integer linear combinations of a set of vectors is called a lattice. These vectors determine the lattice. If a set of vectors is linearly independent then they are called a basis for the lattice they determine. If X is any matrix and G is any unimodular matrix, the rows of X and the rows of G X determine the same lattice. If the rows of X are linearly independent, then the rows of X and of G X are bases of this lattice. While they are both bases of the same lattice, the rows of X and of G X may have different 1-norms, and the product of the 1-norms of the rows of X and of G X can differ.

In step 603, compiler 102 extracts the number of iterations of each of the loops in the loop nest, and creates an integer vector z whose elements are these iteration count numbers. Compiler 102 next creates a diagonal matrix D(z) whose diagonal entries are these same iteration numbers. Compiler 102 then forms a new matrix V D(z), which is the same as matrix V except that each column is multiplied by the corresponding element of z, the iteration counts. In the next part of step 603, compiler 102 computes a 1-norm reduced basis for the lattice spanned by the rows of V D(z). To do so, compiler 102 computes a unimodular r X r matrix G, so that the rows of G V D(z) have a smaller product of 1-norms than the rows of V D(z). Using the example described with reference to FIG. 5, the rows of the matrix V D(z) are a best-possible basis for the lattice that these rows span. Therefore, the matrix G would be the identity matrix.

Regarding Set 2, the 1-norm lattice basis reduction may be computed as follows: the vector z of iteration counts (i.e., for i=0 to 4; j=0 to 9; and k=0 to 14) is computed and is equal to the vector (5,10,15). The matrix V D(z) is equal to:

$$\begin{bmatrix} 5 & 0 & 30 \\ 0 & 10 & -15 \end{bmatrix}$$

The compiler computes a new basis for the lattice generated by the rows. The new basis consists of the rows of G V D(z); for the example of EXAMPLE 5 the unimodular matrix G is $$\begin{pmatrix} 1 & 2 \\ 0 & 1 \end{pmatrix}$$

and the new linear indexing function has matrix G V which is the matrix $$\begin{bmatrix} 1 & 2 & 0 \\ 0 & 1 & -1 \end{bmatrix}$$

The new linear part of the affine index function for this UGPA set is now determined. It is the linear function from loop indices to array indices given by G V I, where I is a vector of loop indices.

The next task for the compiler is to determine new constant vectors for use in reindexed references to host array 202. Compiler 102 computes a left inverse of the hermite factor H of linear index matrix F of the UGPA set (step 604). To compute a left inverse of a matrix X, the columns of X must be linearly independent. The hermite factor H of any matrix has linearly independent columns, so it has left inverses. Given a matrix X with linearly independent columns, a left inverse of matrix X is a matrix Y, such that Y X is the identity matrix. A left inverse of an integer matrix may have rational (fractional) elements. For example, any matrix (a b) for which a+b=1 is a left inverse of the matrix $$\begin{pmatrix} 1 \\ 1 \end{pmatrix}.$$

We denote the left inverse computed in this step by left_inv(H).

Compiler 102 then selects one reference from each AEUGPAS as the dominant reference in the subset. For this reference, the new constant vector is zero. For each of the remaining references, the new constant vector is G left_inv (H) (f–f_0) where f is the original constant vector of the remaining reference and f_0 is the original constant vector of the dominant reference. Note that the left inverse is useful only if there is at least one equivalence class with two or more references. If there is no such equivalence class, there is no need to compute the left inverse.

For example using the above example referred to in FIG. 5, Set 1 does not require a left inverse since there is only one dominant reference in its class. Regarding Set 2, the three references fall into two equivalence classes under the alias equivalence relation, as explained above. The left inverse is:

$$\text{left\_inv}(H) = \begin{pmatrix} .5 & 0 \\ -.25 & .5 \end{pmatrix}.$$

The first subset of alias-equivalent references in Set 2 consists of the references with offset vectors f_1 and f_3 and the second such subset in Set 2 consists of the reference with offset f_2. Note that f_1–f_3 is in the lattice generated by the columns of F and f_2–f_1 is not. Since at least one equivalence class has two or more members, compiler 102 will need the left inverse to compute new constant vectors.

Next in step 605, compiler 102 may determine new offset vectors. Compiler 102 may also determine a new constant vector to relocate the references from original array 201 to host array 202. For each array reference to be replaced, there is a constant vector. Compiler 102 uses "f" computed by Step 601, "G" from Step 603 and left inverse (H) from Step 604. To determine the new offset vectors to be used in replacing the references (in Step 506), compiler 102 subtracts the dominant vector from the offset vectors of the references to be replaced, multiplies the results by a left inverse of H (as determined in Step 604) and multiplies the results by G. This creates the new offset vectors to be used in the replacing references.

For example using the above example referred to in FIG. 5, the new offset in Set 1 is the zero vector. Referring to Set 2, the first equivalence class of references the reference with constant vector f_1 is the dominant reference. The "projected" offset for the other reference is given by G left_inv (H) (f_3–f_1), which is the new offset vector $$\begin{pmatrix} 3 \\ 1 \end{pmatrix}.$$

The other two new offset vectors are zero, because their references are the dominant references in their classes.

In step 606, new vectors are used to replace the references. The vector that replaces f1 may be G left_inv(H)(H) (f_1–f), where f is the constant vector of this chosen dominant reference. For example using the above example referred to in FIG. 5, in Set 1 G and V are both equal to a 3×3 identity matrix. The loop bounds vector is z=[5, 10, 15]. The set of projected offsets consists of the zero vector. The shape of the box that contains this one vector in 3-space is o=[1, 1, 1]. The shape of host array 202 may be the vector abs(G V) (z–1)+o, which is SPM_shape=(z–1)+o=[5, 10, 15]. Note that the host array has 750 elements and the original array has 2000 elements. Compiler 102 may replace the reference to A[i][2*j][k–1] with a reference to SPM_A[i][j][k], and insert a loop to load SPM_A[i][j][k] from A[i][2*j][k–1] before the loop nest.

Referring to Set 2, the matrix abs(G V) is equal to:

$$\begin{bmatrix} 1 & 2 & 0 \\ 0 & 1 & 1 \end{bmatrix}$$

and the vector abs(G V) (z–1) is equal to $$\begin{bmatrix} 22 \\ 23 \end{bmatrix}.$$

For the first class, the offsets are the zero vector and the vector G u_3 above, and the shape of the box that contains these is $$o = \begin{bmatrix} 4 \\ 2 \end{bmatrix}.$$

Compiler 102 allocates a host array 202 (e.g., SPM_B_1) of shape $$\begin{bmatrix} 26 \\ 25 \end{bmatrix}$$

for this class. For the other class o=[1 1] a second host array (e.g., SPM_B_2) of shape $$\begin{bmatrix} 23 \\ 24 \end{bmatrix}$$

is needed. These two host arrays may have 650 and 552 elements, respectively and the original array has 2100. Compiler 102 replaces the first two references to B in the loop nest (both with offset zero) by references to SPM_B_1 [i+2*j][j+k]. Compiler 102 also replaces the fourth reference, having an offset f_3, with a reference to SPM_B_$-1$ $_{[i+}2*j+3$][j+k+1]. The third reference, which is the one and only reference in the second equivalence class, is replaced with a reference to SPM_B_$-2$ $_{[i+}2*j$][j+k]. Compiler 102 also inserts two loops to load SPM_B_1 and SPM_B_2 and one loop to store SPM_B_1 after the loop nest.

Figure 7:
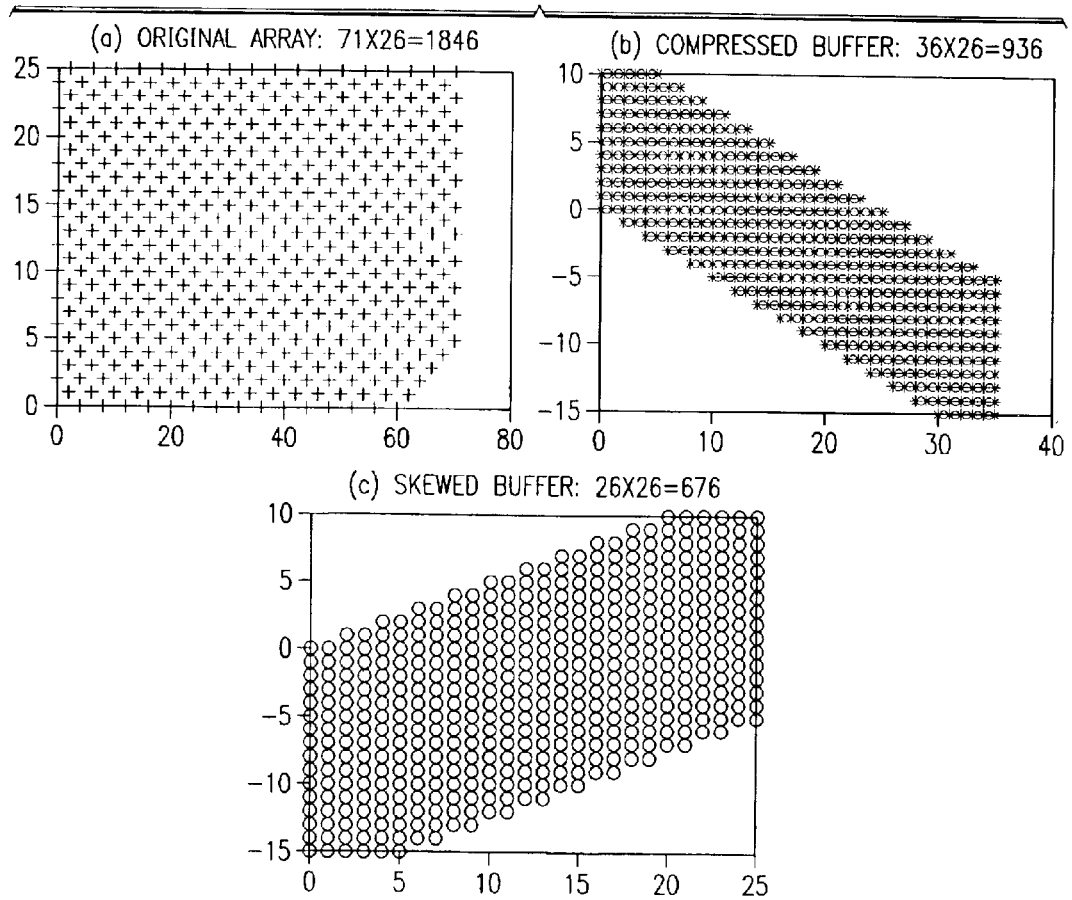
FIGS. 7A–7C show the shape of various host arrays after completing the various steps in FIG. 6.

FIGS. 7A–7C show the shape of host array 202 and the location of data to be accessed therein after completing the various steps in FIG. 6. FIG. 7A indicates the shape of original array 201, wherein data to be accessed is represented by a plus signs ("+"). FIG. 7B indicates the shape of host array 202 after performing Step 602, wherein data to be accessed is represented by asterisks ("*"). FIG. 7C indicates the shape of host array 202 after performing 1-norm step 603 wherein data to be accessed is represented by oh's or circles ("o").

In each case, it can be seen that re-indexing concentrates the data to be used into a smaller array, while data not to be used is not included or minimized in the target SPM host array.

As mentioned above, the optimized source code must include inserted code that moves data from its location in an original array to the corresponding location in the SPM host array, and back if necessary. In these inserted loop nests, it is necessary to calculate the array index of the original array element that holds the same datum as the SPM host array element whose host array index is b. This mapping can be realized with the aid of the mathematical formula $a=H\text{inv}(G)b+f,$ where H is the hermite factor of F and inv(G) is the inverse of G, which is also an integer, unimodular matrix.

A part of the process is to select the loop nests to which to apply this technology. Not all loop nests will benefit from this optimization, for two primary reasons. First, when there is no reuse of the array data, but rather each array element references is only used once (or a small number of times less than some threshold value), then there is nothing to be gained by moving the data from main memory to SPM, because the cost of moving the data out of main memory (overhead) would be equal (or greater than) to the cost of accessing the data from main memory when it is used in the loop nest. This may occur when the compiler considers only the innermost loop or loops in a larger loop nest. A second situation wherein there may be little benefit to optimization includes cases wherein, the size of the SPM host arrays needed to hold the elements of even one of the arrays accessed by the loop nest exceeds the available SPM space. This might happen if the compiler considers only the outermost loops in the loop nests found in the program, wherein the number of elements to be accessed is too large to be accommodated in SPM.

When applied to a machine with a fixed size SPM, a given loop nest may need more space than provided by the computer platform. For each nest examined, the compiler can decide to pack into the SPM as many of the host arrays as will fit, choosing the set that gives the greatest performance benefit if there are several alternative subsets of host arrays that would fit. The choice of a most beneficial set of host arrays that fits can be made by solving a standard combinatorial optimization problem known as a "knapsack" problem.

One problem in re-indexing is selection of the loop nests to be optimized. One method of loop selection requires that the compiler perform a preliminary tiling transformation on the source code program. A tiling transformation is one in which the compiler explicitly creates loop nests that are known to have reuse of data from relatively small parts of certain source code arrays. Therefore, in this situation, the compiler would already know that such a loop nest is a good candidate for applying the optimizations described above.

A second method, particularly well suited to situation wherein there is no prior identification of specific loops to which the present optimization method can be successfully or optimally applied, involves having the compiler start with innermost loops, and evaluate the performance improvement and SPM space requirement for using the present optimization. The compiler then considers each outer loop in each nest in turn and evaluates the SPM space required and the benefit achieved for each level of nesting. In general, both the benefit and the SPM space requirement will grow as one considers loops farther out in the loop nest. The compiler may then choose to apply the optimization at the most beneficial level of nesting in each of the program's loop nests.

While one embodiment of the invention is directed to managing operations and improving performance of SPM, the invention is equally applicable to other environments. For example, many conventional computers have no SPM. Instead, such a conventional computer may be limited to a main memory and a single- or multi-level cache. The cache holds recently referenced data. When a memory word is located or stored (referenced) by the processor, the cache line that includes the referenced word is moved into the cache, displacing the cache line that previously occupied the cache space (a physical cache line) used. A cache line typically consists of 64 or 128 consecutive bytes of the main memory address space, but it may contain more. Thus, it will typically contain from one to four 32- or 64-bit words, i.e., usually it will contain several words.

A loop nest that contains partially affine references may, in some cases, make poor use of the cache for two reasons. First, if the set of array elements that are references by the loop nest are not found in consecutive locations, but are sparsely distributed, then when a cache line is moved into the cache, some, or even most, of the words in the cache line will contain array elements that are not referenced in the loop nest. This wastes the valuable resource of space in the cache. Second, if the set of array elements referenced covers a large range of memory addresses, then several of these referenced words may be mapped by the cache associativity algorithm (an algorithm built into the cache hardware that determines the set of cache locations that are allowed to store a given main memory cache line) into the same physical line of the cache, conflicting for this space, so that not all of them can be held in the cache. This may occur while other physical cache lines remain unused because none of the referenced array elements is mapped by the associativity algorithm into one of these unused physical cache lines.

A program can avoid these undesirable effects by the use of a small auxiliary array, known as a cache mirror. The program can move the referenced data from an original array into a small cache mirror array prior to executing a loop nest that refers repeatedly to this data. The referenced data are densely packed into the cache mirror array, and this dense packing prevents the two undesirable effects discussed above.

Figure 8A:
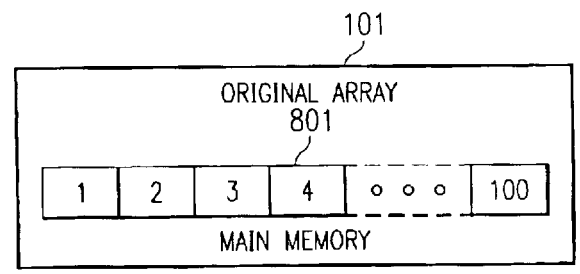
FIGS. 8A and 8B are diagrams of memory and address space allocation of an original array stored in main memory and a corresponding cache mirror array storing only data to be accessed by a particular loop nest.
Figure 8B:
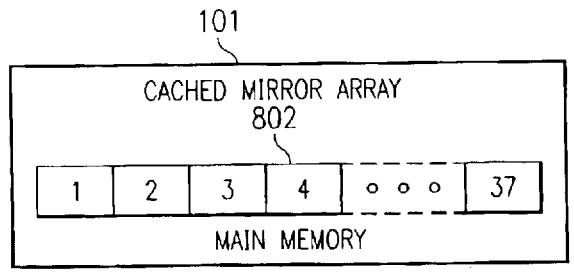

A compiler whose target machine is a conventional computer can optimize the performance of a program by using the method presented above, substituting a cache mirror array for the SPM-resident host array. It can use precisely the same techniques for determining the size of the cache mirror array (as was used to determine the size of the SPM host array) and for determining the new index function used to reference the data in the cache mirror array. The program would also generate the same code to move the data from the original array to the cache mirror array. As previously explained, establishment of a cache mirror in main memory may require definition of a separate array space that is smaller than the original array. For example, with reference to FIG. 8A, an original array 801 includes 100 elements. Assuming that a particular loop nest accesses only 37 (or fewer) of these elements, a cache mirror array 802 as shown in FIG. 8B including these 37 elements is also defined in main memory. Because the cache memory management system will automatically copy these 37 elements into cache memory, and since the elements are located at contiguous addresses in main memory, the copies in cache are also optimized, resulting in enhanced cache performance.

What is claimed is:

1. A method for automatically configuring memory in a data processing system, including steps of:
    receiving source code containing a loop nest, wherein the ioop nest references one or more data arrays;
    optimizing the source code by identifying a set of uniformly generated partially affine array references for the loop nest, all of the references of the set identifying elements of the same one of the arrays, there being at least one dimension of said array for which all the references use an affine indexing function, and all of the affine indexing functions that are used by the references of the set having identical linear array index functions, and determining a new linear index function and new constant vectors for the set wherein elements from a first array are remapped to a second array according to the new linear function and the new constant vectors; and executing the optimized source code.

2. The method according to claim 1, said determining a new linear index function and new constant vectors for the set of array references further comprising extracting an integer matrix and constant vectors from the set.

3. The method according to claim 2, said determining a new linear index function and new constant vectors for the set of array references further comprising determining a 1-norm reduced lattice basis for the set, the new linear index function and the new constant vectors being based at least in part on the 1-norm reduced lattice basis.

4. The method according to claim 2, said determining a new linear index function and new constant vectors for the set of array references further comprising determining a generalized hermite factorization for the set array references, the new linear index function and the new constant vectors being based at least in part on the generalized hermite factorization.

5. The method according to claim 2, said determining a new linear index function and new constant vectors for the set of array references further comprising determining an integer left inverse for the set of array references, the new linear index function and the new constant vectors being based at least in part on the integer left inverse.

6. The method according to claim 1, further comprising processing the source code to compile corresponding object code and generating additional object code effective to transfer data between said first and second arrays.

7. The method according to claim 6, wherein the additional object code is realized using a unimodular matrix related to a 1norm reduced lattice basis.

8. The method according to claim 1, further comprising steps of:
    identifying subsets of alias equivalent array references;
    selecting a dominant reference from each of the subsets; and
    determining a new constant vector for each of said mutually alias equivalent references in each of said subsets.

9. The method according to claim 1, wherein the first array is in a first memory and the second array is in a second memory.

10. The method according to claim 9, wherein elements from the first array are relocated to the second array and are referenced in the second array by replacing references within the set of array references with references to the second array using the new linear index function and new constant vectors.

11. The method according to claim 9, wherein the second memory comprises a memory type selected from the group consisting of main memory, cache memory and scratch pad memory.

12. The method according to claim 11, further comprising forming a set of hardware specifications for indicating an amount of memory required to hold the second array.

13. A method for automatically configuring memory in a data processing system, including steps of:
    receiving source code containing a loop nest, wherein the loop nest references one or more data arrays;
    optimizing the source code by:
        identifying a set of array references for the loop nest that refer to the same one of the arrays and are uniformly generated in two or more indices;
        determining a new linear index function and new constant vectors for the set of array references by extracting an integer matrix and constant vectors from the set and determining a 1-norm reduced lattice basis for the set, the new linear index function and the new constant vectors being based at least in part on the 1-norm reduced lattice basis; and
        remapping elements from a first array to a second array according to the new linear index function and new constant vectors; and
    executing the optimized source code.

14. The method according to claim 13, wherein the array references of the set use affine indexing functions for at least one dimension of the array and wherein all of the references have identical linear array index functions.

15. The method according to claim 13, said determining a new linear index function and new constant vectors for the set of array references further comprising determining a generalized hermite factorization for the set array references, the new linear index function and the new constant vectors being based at least in part on the generalized hermite factorization.

16. The method according to claim 13, said determining a new linear index function and new constant vectors for the set of array references further comprising determining an integer left inverse for the set of array references, the new linear index function and the new constant vectors being based at least in part on the integer left inverse.

17. The method according to claim 13, further comprising processing the source code to compile corresponding object code and generating additional object code effective to transfer data between said first and second arrays.

18. The method according to claim 17, wherein the additional object code is realized using a unimodular matrix related to the 1-norm reduced lattice basis.

19. The method according to claim 13, further comprising steps of:
identifying subsets of alias equivalent array references;
selecting a dominant reference from each of the subsets; and
determining a new constant vector for each of said mutually alias equivalent references in each of said subsets.

20. The method according to claim 13, wherein the first array is in a first memory and the second array is in a second memory.

21. The method according to claim 20, wherein elements from the first array are relocated to the second array and are referenced in the second array by replacing references within the set of array references with references to the second array using the new linear index function and new constant vectors.

22. The method according to claim 20, wherein the second memory comprises a memory type selected from the group consisting of main memory, cache memory and scratch pad memory.

23. The method according to claim 22, further comprising forming a set of hardware specifications for indicating an amount of memory required to hold the second array.

24. A data processing system comprising:
first and second memories; and
a processor operational for optimizing source code containing a loop nest, wherein the loop nest references one or more data arrays, said optimizing comprising identifying a set of uniformly generated partially affine array references for the loop nest, all of the references of the set identifying elements of the same one of the arrays, there being at least one dimension of said array for which all the references use an affine indexing function, and all of the affine indexing functions that are used by the references of the set having identical linear array index functions, and determining a new linear index function and new constant vectors for the set wherein elements from a first array are remapped to a second array according to the new linear function and the new constant vectors.

25. A data processing system comprising:
first and second memories; and
a processor operational for optimizing source code containing a loop nest, wherein the loop nest references one or more data arrays, said optimizing comprising:
identifying a set of array references for the loop nest that refer to the same one of the arrays and that are uniformly generated in two or more indices;
determining a new linear index function and new constant vectors for the set of array references by extracting an integer matrix and constant vectors from the set and determining a 1-norm reduced lattice basis for the set, the new linear index function and the new constant vectors being based at least in part on the 1-norm reduced lattice basis; and
remapping elements from a first array to a second array according to the new linear index function and new constant vectors.

26. A program of instructions stored in computer readable media, said program including program code for:
optimizing source code containing a loop nest, wherein the loop nest references one or more data arrays, said optimizing comprising identifying a set of uniformly generated partially affine array references for the loop nest, all of the references of the set identifying elements of the same one of the arrays, there being at least one dimension of said array for which all the references use an affine indexing function, and all of the affine indexing functions that are used by the references of the set having identical linear array index functions, and determining a new linear index function and new constant vectors for the set wherein elements from a first array are remapped to a second array according to the new linear function and the new constant vectors.

27. The program according to claim 26, said determining a new linear index function and new constant vectors for the set of array references further comprising extracting an integer matrix and constant vectors from the set.

28. The program according to claim 27, said determining a new linear index function and new constant vectors for the set of array references further comprising determining a 1-norm reduced lattice basis for the set, the new linear index function and the new constant vectors being based at least in part on the 1-norm reduced lattice basis.

29. The program according to claim 27, said determining a new linear index function and new constant vectors for the set of array references further comprising determining a generalized hermite factorization for the set array references, the new linear index function and the new constant vectors being based at least in part on the generalized hermite factorization.

30. The program according to claim 27, said determining a new linear index function and new constant vectors for the set of array references further comprising determining an integer left inverse for the set of array references, the new linear index function and the new constant vectors being based at least in part on the integer left inverse.

31. A program of instructions stored in computer readable media, said program including program code for optimizing source code containing a loop nest, wherein the loop nest references one or more data arrays, said optimizing comprising:
identifying a set of array references for the loop nest that refer to the same one of the arrays and that are uniformly generated in two or more indices;
determining a new linear index function and new constant vectors for the set of array references by extracting an integer matrix and constant vectors from the set and determining a 1-norm reduced lattice basis for the set, the new linear index function and the new constant vectors being based at least in part on the 1-norm reduced lattice basis; and
remapping elements from a first array to a second array according to the new linear index function and new constant vectors.

32. The program according to claim 31, wherein the array references of the set use affine indexing functions for at least one dimension of the array and wherein all of the references have identical linear array index functions.

33. The program according to claim 31, said determining a new linear index function and new constant vectors for the set of array references further comprising determining a generalized hermite factorization for the set array references, the new linear index function and the new constant vectors being based at least in part on the generalized hermite factorization.

34. The program according to claim 31, said determining a new linear index function and new constant vectors for the set of array references further comprising determining an integer left inverse for the set of array references, the new linear index function and the new constant vectors being based at least in part on the integer left inverse.

* * * * *